3,526,154
SPEED CONTROL SYSTEM FOR MOTOR
VEHICLES
Edward J. Niedek, 28953 James St.,
Warren, Mich. 48092
Filed Aug. 12, 1968, Ser. No. 751,834
Int. Cl. G05g 5/06
U.S. Cl. 74—526                                         3 Claims

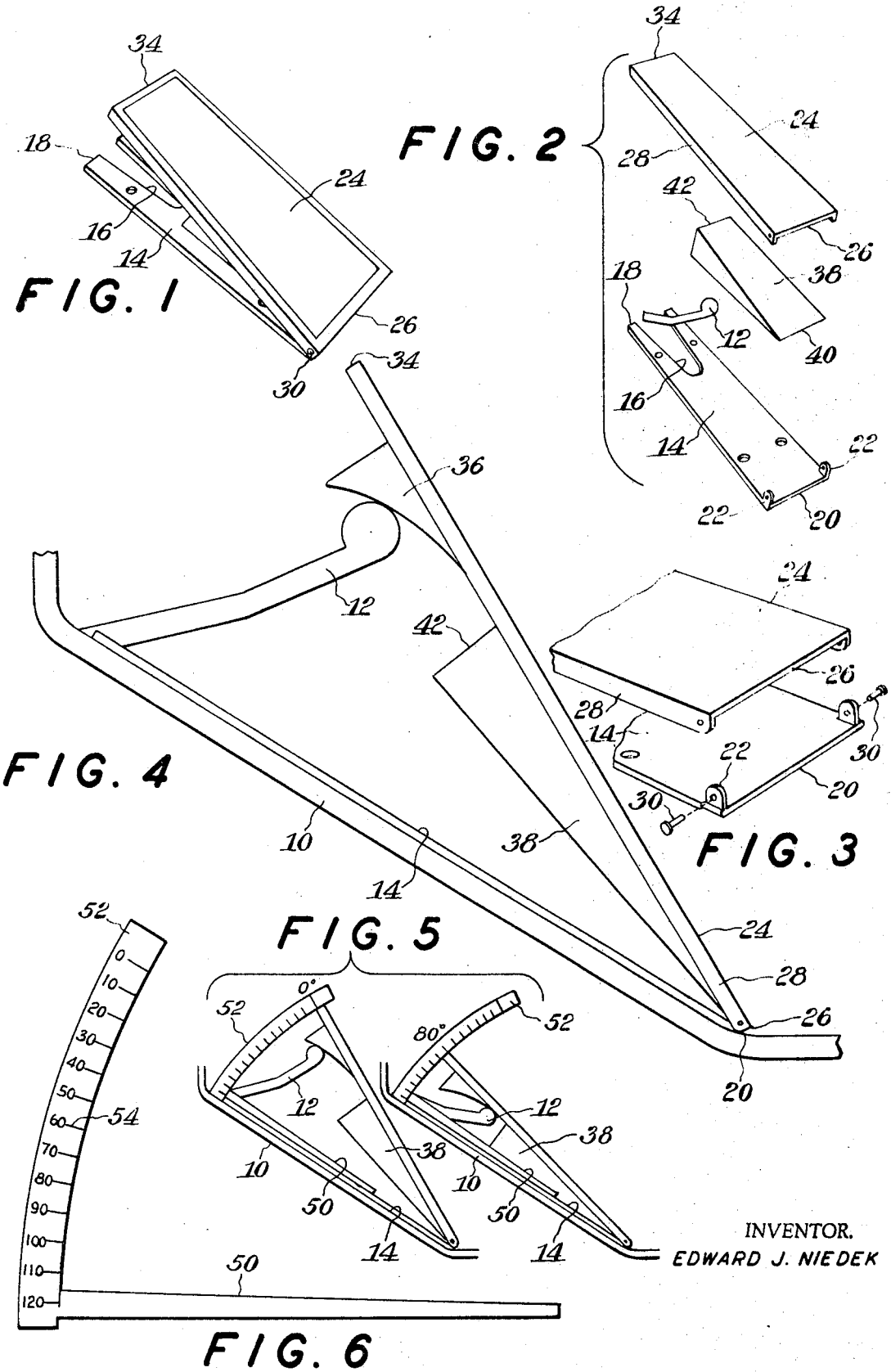

ABSTRACT OF THE DISCLOSURE

A mechanism is disposed between the accelerator pedal and the linkage controlling the flow of fuel to an internal combustion engine (and thereby controlling the speed thereof) to limit the arc through which the pedal can be swung by foot pressure.

A calibrated gauge for measuring the angle of the wedge is provided so that a peace officer or anyone else may quickly and accurately check the setting of the device to determine if the vehicle could be operated in excess of the speed limit of the jurisdiction in which the vehicle is being operated.

SUMMARY OF THE INVENTION

A flat plate is secured to the inner surface of the floor of the vehicle below the pedal. The rear end of the pedal is pivotally secured to the rear end of the plate. The pedal inclines upwardly from the rear end and, at or in the region of its front end, contacts the fuel flow control linkage. When the pedal is depressed by conventional foot pressure, the front end is swung through an arc; the larger the arc, the greater the speed of the engine. The size of the arc is limited only by the distance between front end and the floor.

However, in my invention a wedge is disposed between pedal and plate. The wedge has a thick front end and a thin rear end, the wedge thickness increasing linearly between the ends. The rear end of the wedge is disposed between the rear ends of pedal and plate. The front end and thickest part of the wedge is disposed between the front and rear ends of the pedal and limits the maximum arc through which the pedal can be swung as desired for a preselected engine speed, for example, of 80 miles per hour or any other value which may be set by law.

BRIEF DESCRIPTION OF THE DRAWINGS

In the drawings:

FIG. 1 is a perspective view of my invention;

FIG. 2 is an exploded view of the parts thereof;

FIG. 3 is a detail view showing connection of certain parts thereof;

FIG. 4 is a side view of my invention in use;

FIG. 5 illustrates use of a test gauge with my invention; and

FIG. 6 is a side view of the test gauge per se.

DETAILED DESCRIPTION OF PREFERRED EMBODIMENT

Referring now to FIGS. 1–4, the upwardly inclined front floor board 10 of a vehicle has the speed control linkage 12 extending upward and rearward therethrough. A flat plate 14 is secured by rivets or other means to the top of the floor board with its front endge 18 having a cutout portion 16 through which the linkage 12 extends and a rear end 20 having vertical ears 22.

An accelerator pedal 24 has a rear edge 26 with adjacent depending side walls 28 connected by pins 30 to the matched vertical ears 22 of plate 14 whereby the rear edges 20 and 26 are pivotally secured together. The underside of the pedal 24 adjacent its upwardly inclined front end 34 has formed integrally therewith an arcuate linkage engaging member 36 for sliding engagement with the linkage 12 as in conventional manner as the pedal 24 is depressed and released.

A linearly tapering wedge 38 has a thin rear edge 40 disposed between the pivoted rear edges 20 and 26 and has a thick leading edge 42. The upper surface of the wedge 38 is cemented or otherwise secured to the underside of the pedal 24 with the arcuate member 36 disposed between leading edge of the pedal 24 and the leading edge 42 of the wedge 38.

The wedge 38 serves to limit the maximum arc through which the pedal 24 can be swung and this arc can be calibrated in miles per hour as shown on the gauge (FIGS. 5 and 6).

The angle of the wedge 38 will be determined by the maximum speed limit of the jurisdiction in which the vehicle is to be operated. When once set in position and secured to the vehicle as previously described, the operator of the vehicle cannot exceed the speed limit without tampering with the device.

The gauge shown in FIGS. 5 and 6 has a flat base 50 and a vertical arc like extension 52 with mileage calibration marks 54 thereon.

A policeman or any other authorized individual can readily check the speed capacity of the vehicle by holding the base plate 50 of the gauge on the plate 14 of the device and then pressing the accelerator pedal 28 downward until the angular face of the wedge 38 contacts the base plate 50 of the gauge. He can then read off on the gauge the speed limit which can lawfully be used by the operator. This checking can be done with the vehicle engine running and out of gear or when the vehicle is parked with the engine shut off. It is believed that the operation of the device is obvious from the foregoing description.

While I have described my invention with particular reference to the drawings, such is not to be considered as limiting its actual scope.

Having thus described this invention, what is asserted as new is:

1. A mechanism adapted for speed control of a motor vehicle having an upwardly inclined floor board with a speed control linkage extending therethrough, said mechanism comprising, a flat plate secured to the top surface of said floor board, said plate having a front end and a rear end, an accelerator pedal inclining upwardly from its rear end to its front end, first means pivotally securing the rear end of said pedal to the rear end of said plate, a wedge disposed between said pedal and said plate to limit arc through which the pedal can be swung when subjected to foot pressure to a value less than that between the plate and the pedal in rest position, a linkage engaging member secured to the underside of the pedal adjacent the front end thereof and arranged to engage said linkage, said wedge tapering linearly between a thick front edge and a thin rear edge, the front edge of said wedge being disposed between the front portions of said plate and said pedal.

2. The structure set forth in claim 1 wherein said linkage engaging member is disposed between the front end of the pedal and the front end of the wedge.

3. The mechanism as set forth in claim 2 including a gauge member having a base plate to be received on said first named plate and a calibrated, vertical, arcuate extension for indicating the degree of downward travel of said pedal when under pressure.

References Cited

UNITED STATES PATENTS

| | | | |
|---|---|---|---|
| 1,605,341 | 11/1926 | Gilbough | 74—513 |
| 1,915,695 | 6/1933 | Ritzwoller | 74—513 |
| 2,072,285 | 3/1937 | Walker | 74—513 XR |
| 2,207,435 | 7/1940 | Jones | 74—526 XR |
| 2,712,359 | 7/1955 | Kramer | 74—513 |
| 2,924,117 | 2/1960 | Byrd | 74—526 |

FRED C. MATTERN, JR., Primary Examiner

F. D. SHOEMAKER, Assistant Examiner